March 19, 1968  H. F. BENSON  3,374,044
FILTERED WAVE-ENERGY CORNER-REFLECTOR
Filed Nov. 3, 1964
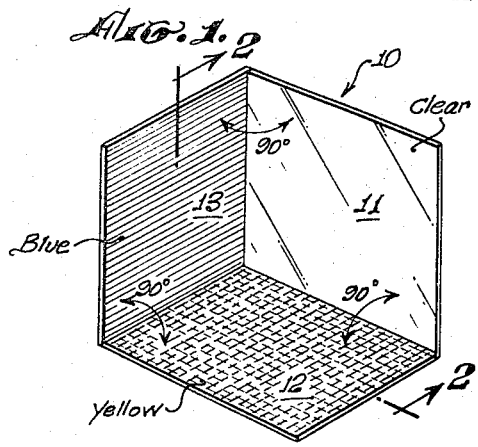
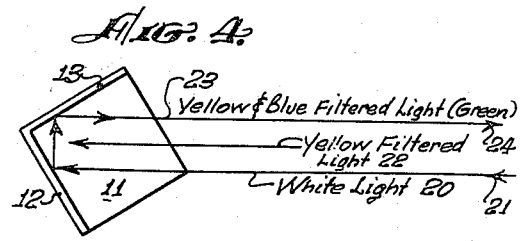
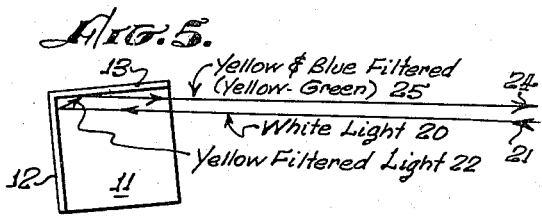
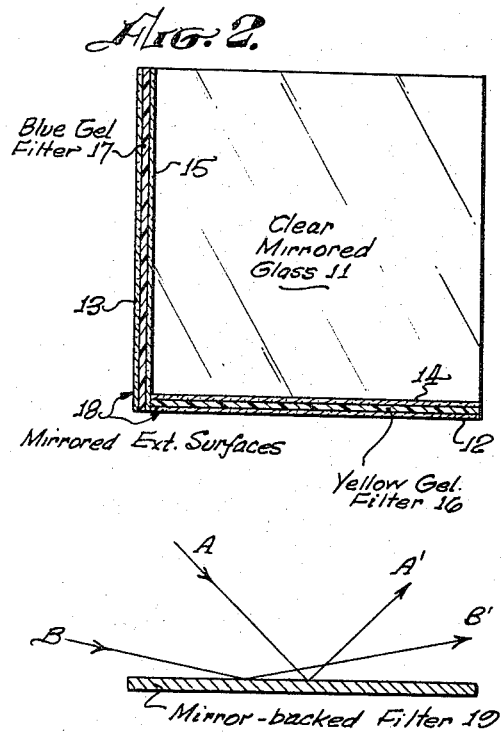
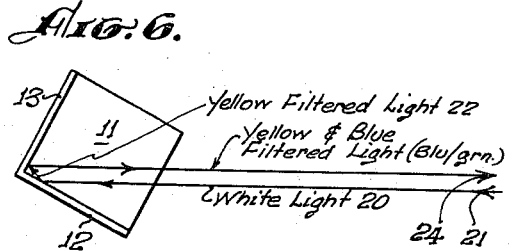
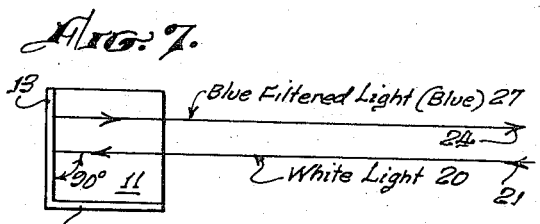
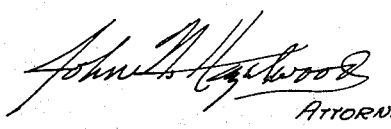
INVENTOR.
HOWARD F. BENSON,
By
ATTORNEY.

United States Patent Office 3,374,044
Patented Mar. 19, 1968

3,374,044
FILTERED WAVE-ENERGY CORNER-REFLECTOR
Howard F. Benson, Pomona, Calif., assignor to General Dynamics Corporation, Pomona, Calif., a corporation of Delaware
Filed Nov. 3, 1964, Ser. No. 408,530
7 Claims. (Cl. 350—102)

ABSTRACT OF THE DISCLOSURE

This disclosure is directed to a reflector device adapted to receive wave-energy from a source and to reflect it back so encoded that physical orientation of the point source relative to the reflector may readily be determined. More particularly, the illustrated reflector is in the form of a corner-reflector comprising three relatively fixed planar reflectors so disposed that each reflector is perpendicular to the other two. Two of the reflectors are each covered with a filter, while the third reflector is left unfiltered. The filters utilized for illustration are primary color filters, for example, one of the filters is a primary yellow, while the other is a primary blue. Orientation of the wave-energy source relative to the reflector is determined by the particular type of wave-energy being reflected back toward the source, whether, as illustrated, it be basically green, yellow-green, blue-green, etc. The wave-energy reflected will be dependent on the type of filters utilized and the angle at which an incident beam strikes the device.

---

This invention relates to reflector devices, and particularly to a reflector device which will accept wave-energy from a collimated beam and send it back toward the source of the beam in encoded form.

There have been many attempts in the past to provide simple and effective devices for different purposes which function on a light reflecting principle. However, no such device is known for applications such as surveying, aircraft runway indication, small-craft navigation, etc., wherein the device reflects, back to its collimated beam source, wave-energy which is altered systematically, and in fixed proportion to the angular deviations of the reflecting surfaces from the bearing-axis of the collimated beam.

Therefore, it is an object of this invention to provide a reflector apparatus adapted to reflect wave-energy.

A further object of the invention is to provide a device for reflecting light of different colors.

Another object of the invention is to provide a light reflecting device having different light reflecting properties and constructed to cause the light beam reflected by said device to vary systematically in appearance as the light source is moved across the device.

Another object of the invention is to provide a construction for a reflector apparatus by means of which the apparatus may be made to return a reflection varying in color during the movement of the light source, so that the varying reflection will attract attention.

Another object of the invention is to provide a reflecting and filtering surface which will alter the relative strength of a selected frequency or frequency band, when compared with the strength of the same selected frequency, or band of frequencies, as it appears in the incident broad-band wave-energy beam from a collimated beam.

Another object of the invention is ot provide an apparatus which will return, by reflection, a portion of an incident broad-band wave-energy beam back to its collimated beam source.

Another object of the invention is to provide a reflecting apparatus, consisting of three surfaces, properly oriented to each other, which will return a major portion of the incident broad-band wave-energy beam back toward its source.

Another object of the invention is to provide a device which will accept wave-energy from a collimated beam and send it back to the point source so encoded that an observer, or a measuring device, at the source can determine his bearing, relative to the device, or the attitude of the device (physical orientation) relative to himself.

Other objects of the invention, not specifically set forth above, will become readily apparent from the following description and accompanying drawings wherein:

FIG. 1 is an isometric view of the invention;
FIG. 2 is a cross-sectional view taken on the line 2—2 of FIG. 1;
FIG. 3 is a schematic view illustrating the principle of the invention; and
FIGS. 4–7 are schematic views which illustrate examples of the operation of the invention.

Referring now to FIGS. 1 and 2, the invention is illustrated in the form of an optical corner-reflector or half-cube 10. It consists basically of three pieces of mirrored glass indicated at 11, 12 and 13 and fixed to each other so that each is at 90 degrees (perpendicular) to the other two thus forming, in this illustration, three adjacent sides of the half-cube 10. Two of the mirrors (12 and 13) have been fitted, on the inside faces or surfaces, with cover-holders or cover-sheets 14 and 15, respectively, for gelatin type color filters, 16 and 17, respectively, filter 16 being primary yellow with filter 17 being primary blue, the gelatin being poured between the mirrors and the cover sheets and allowed to harden. The third mirror or face 11 is not provided with a filter and is thus considered as being clear. All three mirror surfaces 11, 12 and 13 have a mirror-coating on the outside surfaces as indicated at 18 in FIG. 2. If desirable, filter glass may be used instead of the cover sheets and gelatin color material illustrated.

The operation of the illustrated device is dependent upon two premises. The first is illustrated in FIG. 3 which indicates that the flatter the angle of incidence, as at angle B–B′, the more the light is reflected off the top of the filter, and the less the light is filtered by travel through the filtering medium indicated at 19 of mirror-backed filter 16 or 17 of either mirrored glass pieces 12 or 13. At a higher angle of incidence, as in angle A–A′, less light bounces off the surface and more travels through the filter 19. Thus, with a fixed reflector, the percent of filtering which takes place is proportional to the angle of incidence of the light beam with respect to the filter. Orientation of the apparatus relative to line of sight from the collimated beam is determined by the color reflected back in a direction toward the collimated beam.

The second premise, as illustrated in FIGS. 4–7 is that, since the angles of the reflectors are fixed, each filter-mirror (12 and 13) will filter the incoming light beam, but in proportion to its own particular angle to the incoming beam. For purposes of comprehension, the description and illustration in FIGS. 4–7 is limited to two wings 12 and 13 of the half-cube 10. In the embodiment of the invention illustrated, a band-pass filter is used. If a "notch" filter were used, a set of photocells could readily read out which "notch" frequency was most nearly filtered out, which was second most completely filtered out, etc., and could be calibrated in terms of angles to the incident beam, which would be "white" or wide-band light.

Referring now to FIGS. 4–6, a white light beam or input indicated at 20 from a collimated beam source 21 is reflected off the yellow filter mirror 12 giving off yellow filtered light indicated at 22 which is reflected off the blue filter mirror 13 thus giving a yellow and blue filtered (green) light indicated at 23 in FIG. 4 which is beamed back to an observer or the like indicated at 24, a yellow and blue filtered (yellow-green) light indicated at 25 in FIG. 5, and a yellow and blue filtered light (blue-green) light indicated at 26 in FIG. 6. The light 21 is in the form of a substantially collimated beam whose cross-sectional area is small compared to the size of the reflector device. The different colors of the light beams 23, 25 and 26 are determined by the angle of incidence of the light beam with respect to the filters. In FIG. 4 the angle of incidence of the yellow filtered light 22 is medium and thus there is a medium filtering effect; FIG. 5 has a high angle of incidence of light beam 22 which equals a high filtering effect; and FIG. 6 has a low angle of incidence of light beam 22 which equals a low filtering effect.

FIG. 7 illustrates the ultimate incidence angle of 90° between a mirror surface and the collimated beam which misses the clear filter or mirror 11, misses the yellow filter 16 of mirror 12 and returns a blue filtered light indicated at 27 to the observer 24.

The reflector device of the invention can have applications which range from the optically precise and expensive mechanism to the optically satisfactory and less expensive mechanism. It may be used for runway markers that would tell the pilot the lay of the runway relative to the aircraft. It may be put in pairs along channels for navigation of small boats whose owners would need nothing more than a flashlight to give them not only their distance from one or more of the devices, but their bearing as well. It may also be applied in the surveying business where large scale operations are in constant trouble with markers that can't be seen far enough; thus, with or without filters, it would make a clear check-point at night with a searchlight, and by day with a pocket mirror.

It is not intended that the operation of the device of this invention be limited in scope to visible light and band-pass filters. It could operate all across the electromagnetic spectrum, either with band-pass, band-reject (notch), or polarizing filters. It may also have applications to underwater sound (sonar) or on fog-bound highways, etc.

The foregoing thus illustrates that this invention provides a filtering reflector apparatus, consisting of three such reflecting and filtering surfaces, properly oriented to each other, and to a source of broad-band, wave-energy, which will return a major portion of the incident beam back to its source, with three selected frequencies, or frequency bands, systematically altered in strength, relative to the incident beam, in such a way as to indicate, for visual, audio, or instrumental inspection, the angular deviation of each of the three reflecting and filtering surfaces from the line of bearing of the source of the incident beam.

It has thus been shown that the present invention provides a simple and effective device which will accept wave-energy from a source and send it back to the source so encoded that an observer, or a measuring device, at the source can determine his bearing, relative to the device, or the attitude of the device (physical orientation) relative to himself.

While specific colored filters have been illustrated and described, the invention is not limited to these specific colors, and any colors or combinations thereof, suitable for specific applications, may be utilized.

Although a specific embodiment of the invention has been illustrated and described, modifications will become apparent to those skilled in the art, and it is intended to cover in the appended claims all such modifications as come within the spirit and scope of the invention.

What I claim is:

1. A reflector device comprising at least three planar reflectors operatively positioned so that each reflector is perpendicular with respect to each other reflector and in contact with one another defining a common corner, at least two of said reflectors being provided with different wave-energy filtering means positioned closely adjacent thereto and substantially parallel therewith, whereby wave-energy from an associated source is reflected from at least one of said reflectors back in the direction of such an associated source, the wave-energy reflected back being dependent on the filtered reflector or reflectors reflected from and the angle of incidence of the wave-energy beam from such an associated source with respect to the reflector or reflectors reflecting the wave-energy.

2. A reflecting device comprising at least three planar mirrored pieces operatively positioned so that each mirrored piece is perpendicular with respect to each other mirrored piece, said mirrored pieces being secured together so as to define at least one common corner, certain of said mirrored pieces being provided with different color filtering means positioned closely adjacent thereto and substantially parallel therewith, at least one of said mirrored pieces being clear, whereby light from an associated source is reflected from at least one of said mirrored pieces back in the direction of such an associated source, the color of the light reflected back being dependent on the color of the filtered mirrored piece or pieces reflected from and the angle of incidence of the light beam from such an associated source with respect to the color filtering means of the mirrored piece or pieces reflecting the light.

3. A device which will accept light energy from a source and reflect it back to such a source so encoded that the location of such a source can be determined, said device including three pieces of planar mirrored material fixed to each other so that each mirrored piece is at 90 degrees with respect to the other two mirrored pieces and defining a corner-type reflector, two of said mirrored pieces being provided with different color filtering means positioned closely adjacent thereto and substantially parallel therewith and on the inside surfaces thereof of said corner-type reflector, whereby light from an associated source is reflected from at least one of said mirrored pieces back to such an associated source, the color of the light being reflected back to such an associated source being dependent on the color of the mirrored piece or pieces reflected from and the angle of incidence of the light beam from such an associated source with respect to the mirrored piece or pieces reflecting the light.

4. The device defined in claim 3, wherein each of said mirrored pieces are of a square configuration.

5. The device defined in claim 3, wherein said color filtering means comprises a clear layer of material positioned in spaced relationship with the inside surface of said two mirrored pieces, and color material interposed between said clear material and said inside surfaces.

6. The device defined in claim 3, wherein each of said mirrored pieces are also provided with a mirror-coating on the outside surfaces thereof.

7. The device defined in claim 3, wherein one of said color filtering means is of a primary yellow and the other color filtering means is of a primary blue.

References Cited
UNITED STATES PATENTS

| | | | |
|---|---|---|---|
| 1,377,161 | 5/1921 | Vanderbeek | 350—97 |
| 1,754,899 | 4/1930 | Miller et al. | 350—102 |

DAVID H. RUBIN, *Primary Examiner.*

R. J. STERN, *Assistant Examiner.*